Oct. 23, 1962     E. KEUNECKE ET AL     3,060,106

APPARATUS FOR VACUUM FRACTIONAL DISTILLATION

Filed Jan. 5, 1959

Inventors:
Emil Keunecke & Otto Stahnke
By    Patent Agent

United States Patent Office  
3,060,106  
Patented Oct. 23, 1962

3,060,106
APPARATUS FOR VACUUM FRACTIONAL DISTILLATION

Emil Keunecke, Koln, and Otto Stahnke, Widdig, near Bonn, Germany, assignors to Leybold Hochvakuum-Anlagen G.m.b.H., Koln-Bayental, Germany
Filed Jan. 5, 1959, Ser. No. 784,992
Claims priority, application Germany Aug. 28, 1958
3 Claims. (Cl. 202—205)

The invention relates to a method and a device for fractional distillation under vacuum, preferably under high vacuum, wherein a charging material, which is spread out in a thin layer, is evaporated and precipitated on a cooled condensation surface.

Vacuum distillation is a process in common use in the present-day chemical art and the most varied apparatus is known for carrying it out. With distillation in the fine and high vacuum field, in particular, it is advisable to convey the charging material over the evaporating surface in a thin layer, that is to say in the form of film. With such evaporation of extremely thin layers, the condensation of the evaporated substance takes place on a condensation surface which is as close as possible to the evaporating surface. Such apparatus for short-path distillation is used in the distillation of high-molecular, temperature-sensitive substances, but insufficient fractionating action occurs.

Above all, these previously known methods and devices cannot be used when a fractionating of mixtures has to be carried out, the components of which differ only slightly as regards vapour pressure.

The present new invention overcomes this difficulty and affords a satisfactory separating action even in the separation of mixtures with only slight differences in the vapour pressure. For this purpose, according to the invention, a rotating, spiral-shaped, perforated insert is arranged between the evaporation surface and the condensation surface in such a manner that the charging material, after evaporating from the evaporator surface, first condenses on the adjacent outer surface of the first turn of the spiral-shaped insert, then passes through the perforation to the inner surface, and from there the lighter volatile components evaporate further onto the outer surface of the next turn while the heavier volatile components on the inner surface of the spiral insert are returned to the evaporator surface by centrifugal force. Thus it is a question of a particularly advantageous series connection of a plurality of evaporator and condensation surfaces by means of which a very effective fractionating is achieved.

The charging material evaporated from the evaporator surface first forms a condensation film on the outer surface of the first turn of the spiral insert and by means of centrifugal force, this film is spread over the inner surface through the suitable shaped perforations. From there, the lighter volatile components evaporate, condense on the outer surface of the next turn, again pass through the perforations to the inner surface of this turn, and this process can be repeated many times depending on the number of spiral turns. Finally, the lighter volatile components collect on the condensation surface while the heavier volatile components in the form of a film on the inner surface flow back to the outside against the direction of rotation of the spiral insert, to the evaporator surface, in the course of which, as a result of the temperature drop, they come into a higher temperature region so that continued fractionating occurs. The residue is flung off at the outer end of the spiral insert and reaches a suitable collector together with the residues from the evaporator surface.

In order to obtain a satisfactory fractionating effect, the speed of the spiral insert, the number of turns and the spiral pitch have to be adapted to one another. In general, the most satisfactory results will be obtained with a construction wherein the spiral insert has only a few turns. Other constructions may be advantageous, however, depending on the raw material involved.

An advantageous further development consists in that the spreading of the charging material on the evaporator surface is effected by distributor means preferably secured to the spiral insert. Such distributor means for spreading thin layers in vacuum distillation plants are already known in various forms. For example, it is possible to use brushes, wipers or spatula-like sliding surfaces. These distributor means may likewise be secured to the spiral insert in various ways. A single or multi-row arrangement along generatrices is advantageous.

In an advantageous device for carrying out the new method, the perforation of the spiral insert is constructed in the form of pocket-like apertures situated on the outer surface in such a manner that no optical view is possible in the radial direction but tangential passage of liquids is possible counter to the direction of rotation. As a result of this construction, direct penetration of the vapours to the cooled condensation surface is prevented and the desired contact with the surface of the spiral insert is enforced. Such a perforation may either be provided evenly over the whole outer surface of the spiral insert or only in sections. Moreover, instead of the pocket-like apertures, individual pockets extending over the whole height of the spiral insert may be provided.

In a suitable construction, a distributor plate, known per se, is provided on the rotatable spiral insert, to which distributor plate the charging material is supplied and which causes it to be spread over the evaporator surface.

The device described may be used to particular advantage for high-vacuum distillation, that is to say in pressure ranges below $10^{-2}$ mm. Hg, but its use is also possible and in many cases is advisable, at higher pressures.

One embodiment of the subject of the invention is illustrated diagrammatically in the drawing, in which.

Figures 1, 2, 3:
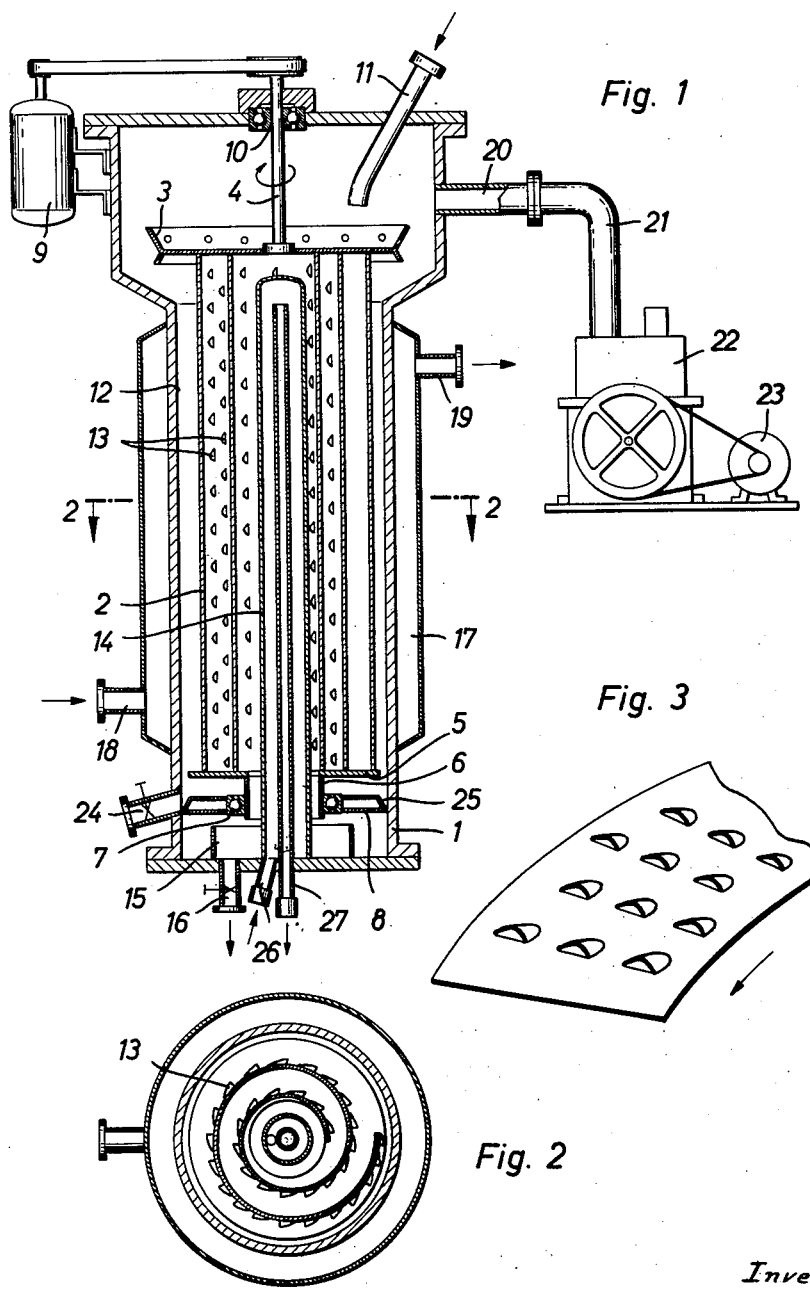
FIGURE 1 is a longitudinal section through a distillation device according to the invention.
FIGURE 2 is a cross-section through a distillation device according to FIGURE 1, along the line 2—2 of FIGURE 1.
FIGURE 3 shows part of the outer surface of the spiral insert.

FIGURES 1 and 2 show a cylindrical housing 1 in which a spiral insert 2 is mounted for rotation. At its upper end, this spiral insert 2 is secured to a distributor plate 3 with which it is connected to a driving shaft 4. At the lower end of the spiral insert 2 there is provided a circular closing disc 5 which is secured to a tubular bearing member 6. The tubular bearing member 6 is mounted for rotation on a tray 8 by means of a ball bearing 7. The drive of the spiral insert 2 is effected through an electric driving motor 9 on the driving shaft 4 which is likewise mounted in ball bearings at 10 in the housing 1. Leading into the upper portion of the cylindrical housing 1 is an inlet pipe 11 through which the charging material can be supplied to the distributor plate 3. Overflowing from the edge of the plate, the charging material reaches the evaporator surface 12. Pocket-like perforations 13 are provided in the outer surface of the spiral insert 2 as indicated in FIGURES 1 and 2.

In the region of the central axis of the cylinder, in the housing 1 is a cooled condensation surface 14 on which the distillate condenses and reaches a collecting trough 15 from which it can be drawn off through an outlet 16 which can be shut off. In the region of the longitudinal extension of the spiral insert 2, the cylindrical housing 1 is surrounded by a heating jacket 17 which can be heated by a heating medium in liquid or vapour form which is supplied at 18 and drawn off again at 19.

Also at the top of the housing 1 is a pipe connection 20 to which a vacuum pump 22 with a driving motor 23, used for the evacuation of the interior of the housing, is connected through a pipe 21. The residue collects in a collar 25 and can be removed at the bottom of the cylindrical housing 1 through an outlet device 24 which can be shut off. The condensation surface 14 is water-cooled, the coolant being supplied through a pipe 26 and drawn off again through an outlet 27.

FIGURE 3 shows the special pocket-like construction of the apertures 13 on the outer surface of the spiral insert 2.

We claim:

1. A device for fractional distillation under vacuum comprising: means forming a fluid-tight casing; suction means communicating with said casing for maintaining a vacuum therein; means for heating said casing so that its inner surface acts as an evaporation surface; a condenser arranged centrally of said casing; means for cooling said condenser so that its outer surface acts as a condensing surface; inlet means communicating with said casing for charging material thereinto and onto said evaporation surface; outlet means communicating with said casing for removing material condensed on said condensing surface; a tubular spiral-shaped insert arranged interiorly of said casing and encompassing said centrally arranged condenser, said insert being formed with pocket-like apertures and being mounted for rotation about its axis; and means for rotating said insert about said axis thereof, whereby a material charged into said casing and spread out in a thin layer on said evaporation surface evaporates, thereafter condenses on the adjacent outer surface of the first turn of said spiral insert, and thereafter passes through the apertures to the inner surface of said first turn from which the lighter volatile components evaporate further onto the outer surface of the next turn while the heavier volatile components on said inner surface of said first turn are centrifuged outwardly and thereby returned to said evaporator surface constituted by the heated inner surface of said casing, the entire process taking place in a vacuum created by said suction means.

2. A device as defined in claim 1 wherein said insert is oriented vertically and carries at its top a distributor plate onto which said inlet means are trained, said distributor plate being formed with an upwardly extending flange portion over which flows the material being charged into said casing.

3. A device as defined in claim 1 wherein said pocket-like apertures are so shaped that material may not pass through the spiral insert in radial direction but only a direction that is substantially tangential.

References Cited in the file of this patent

UNITED STATES PATENTS

| | | |
|---|---|---|
| 1,083,802 | Castona | Jan. 6, 1914 |
| 2,180,052 | Hickman et al. | Nov. 14, 1939 |
| 2,220,171 | Noaillon | Nov. 5, 1940 |
| 2,493,220 | Bibby | Jan. 3, 1950 |
| 2,500,900 | Madlen | Mar. 14, 1950 |
| 2,617,760 | Burrows | Nov. 11, 1952 |
| 3,004,901 | Nerge et al. | Oct. 17, 1961 |